United States Patent [19]

Hanser

[11] 4,148,125

[45] Apr. 10, 1979

[54] PROCESS OF AND DEVICE FOR SEATING A RING TYPE SEAL IN A GROOVE

[75] Inventor: Paul E. Hanser, Moline, Ill.

[73] Assignee: HWH Corporation, Rock Island, Ill.

[21] Appl. No.: 874,899

[22] Filed: Feb. 3, 1978

[51] Int. Cl.² .............................................. B23P 11/02
[52] U.S. Cl. .......................................... 29/451; 29/235
[58] Field of Search .................................. 29/451, 235

[56] References Cited

U.S. PATENT DOCUMENTS

| | | | |
|---|---|---|---|
| 3,455,011 | 7/1969 | Harding | 29/235 |
| 4,027,372 | 6/1977 | Mitchell | 29/235 |
| 4,091,521 | 5/1978 | Dygert | 29/451 |

FOREIGN PATENT DOCUMENTS

| | | | |
|---|---|---|---|
| 1265078 | 3/1968 | Fed. Rep. of Germany | 29/235 |
| 2312787 | 9/1974 | Fed. Rep. of Germany | 29/235 |

*Primary Examiner*—Charlie T. Moon
*Attorney, Agent, or Firm*—Thomas E. Frantz

[57] ABSTRACT

Three pressure elements are employed in reducing the transverse area circumscribed by the outer periphery of a resilient ring type seal to permit its placement in a groove formed in a bore which is smaller in circumference than the outer periphery of the seal. One pressure element is applied to the outer periphery of the seal, and two to its inner periphery at points which are spaced equally on either side of a line which extends from the center of the seal through the outer pressure element. The two inner pressure elements are then rotated outwardly in opposite directions around the outer pressure element to fold a portion of the seal inwardly on itself around the outer pressure element, thereby reducing the transverse area circumscribed by the outer periphery of the seal. While so reduced, the seal is placed within the bore opposite the groove, and the outer pressure element then drawn axially out of engagement with the outer periphery of the seal to permit its expansion into the groove.

21 Claims, 6 Drawing Figures

PROCESS OF AND DEVICE FOR SEATING A RING TYPE SEAL IN A GROOVE

FIELD OF THE INVENTION

The present invention relates generally to the seating or emplacement of a seal in a groove. More particularly, this invention is directed to a process of and a device for reducing the transverse area circumscribed by the outer periphery of a resilient ring type seal to permit its placement in a groove formed in a bore which is smaller in circumference than the periphery of the seal.

BACKGROUND OF THE INVENTION

In hydraulic and pneumatic cylinders and similar assemblies, it is generally necessary to provide means for sealably engaging a rotating and/or reciprocating shaft, piston, ram or similar member to prevent the ingress of soil, moisture or other contaminates or the egress of oil, air, grease or other actuating or lubricating substances.

Such sealing engagement normally is accomplished through use of a resilient ring type seal seated in a closely fitting groove which is machined or otherwise formed in the bore of an elongate cylinder, sleeve, or the like. As the seal is seated in this groove, its outside periphery obviously must be larger than the circumference of the bore in which the groove is formed. Thus, if a seal should be molded or otherwise made of a relatively stiff material, such as Teflon, Nylon, urethane or polyproplene, considerable difficulty may be experienced in deforming it sufficiently to permit its convenient introduction into and movement through the bore, while simultaneously holding it in such position that it will properly enter and seat in the groove. And particularly if the bore is of relatively small diameter or the seal is unusually stiff and/or the groove is spaced a substantial distance within the bore, such emplacement can become quite time consuming and troublesome.

Over the years, various suggestions have been advanced for processes and/or devices intended to reduce or alleviate the problems associated with the emplacement of such seals. As examples of such prior proposals, attention is called to the following representative U.S. Pat. Nos. 3,180,015; 3,990,138; 3,406,441; 4,027,372; 3,455,011.

As far as is known, however, such prior processes and/or devices have been quite limited in their usefulness, and have met with little or no significant commercial success. For instance, U.S. Pat. Nos. 3,180,015—3,406,441 and 4,027,372 show structures containing axially slidable members which not only require that a seal be stretched longitudinally but simultaneously bent at substantially a right angle preparatory to its entry into a bore and placement in the groove. Thus, the practical usefulness of such devices is limited almost exclusively to highly flexible seals (i.e. the usual O-ring) which can readily accommodate simultaneous and relatively severe distortion and bending.

The device taught in U.S. Pat. No. 3,990,138 not only involves a relatively complex structure, but would appear to present problems in terms of the assembly of the seal with the tool preparatory to emplacement of the seal. For example, unless it should be quite flexible and of a definite predetermined size, the average user could experience difficulty in "threading" the seal manually around the transversely fixed pins provided by the embodiment of FIGS. 4–7 of this prior patent.

The pliers type tool of U.S. Pat. No. 3,455,011 represents a somewhat simpler and more practical approach, in that the seal is easily disposed on the jaws of this device, and the jaws are operated by a simple squeezing action. Even in this instance, however, problems would be encountered in stretching a seal sufficiently around the back curved portion of the horseshoe shaped jaw to permit its proper deflection into the front slot—particularly if the user should lack a strong grip or if the seal should be relatively stiff and/or of sufficient thickness to wedge between the movable "pin" jaw and the mouth of the slot. Further, because of the fixed size of the horseshoe shaped jaw, this prior device would be quite limited in terms of its potential usefulness with cylinders and sleeves of various diameters.

Accordingly, while various suggestions have been proposed in an effort to solve the long recognized problems normally encountered in attempting to emplace various types of seals, such prior proposals have failed to provide an inexpensive, relatively simple, rugged, easily handled device which is adapted for use with seals of various degrees of resiliency and of various sizes and configurations, and with cylinders of various diameters and lengths.

SUMMARY OF THE INVENTION

This invention provides a process of and a device for quickly and easily deforming a resilient or semi-resilient ring type seal to reduce its effective outer periphery, for readily holding the deformed seal while it is being aligned with a groove formed within the bore of a cylinder, and for conveniently releasing the deformed seal to permit its expansion into the groove.

In its preferred form, the process is embodied in a device comprising an elongate body assembly provided adjacent its lower end with three substantially cylindrical pressure elements disposed in a generally parallel relationship. The first pressure element is transversely fixed but axially slidable relative to the body assembly between a retracted position transversely aligned with the other two pressure elements. In turn, these other two pressure elements are axially fixed relative to the body assembly, but are transversely rotatable relative to one another around the longitudinal axis of the first pressure element. The radial distance between the first pressure element and the other two pressure elements is substantially equal, such distance being somewhat greater than the maximum cross sectional width of the seal to be emplaced.

In using the process and device, the first pressure element is extended and positioned in contact with the outer periphery of the seal, and the second and third pressure elements are positioned in contact with its inner periphery. The second and third pressure elements are then rotated outwardly in opposite directions around the first pressure element. Such rotation has the effect of moving the first pressure element transversely toward the center of the seal, whereby a portion of the seal is folded inwardly on itself around this pressure element. As will be understood, such deformation will reduce the transverse area circumscribed by the outer periphery of the seal.

While in its deformed configuration, the seal is readily introduced into the bore of an appropriate cylinder, and moved axially therein into alignment with the groove in which it is to be seated. Thereafter, the first pressure element is shifted axially relative to and out of engagement with the seal, thereby releasing the seal and permitting it to seat itself in the groove as it expands to its original dimensions in response to its inherent resiliency.

Accordingly, it is a principal object of this invention to provide an improved process and device for emplacing a ring type seal in a groove bounded by a bore which in circumference is smaller than the periphery of the seal.

Another objective of this invention is the provision of a process and device for use in reducing the effective outer periphery of a resilient ring type seal to permit its convenient emplacement in a groove bounded by a bore which is circumference is smaller than such periphery.

Yet another object of this invention is to provide an improved tool for emplacing a resilient ring type seal in a groove, the tool providing three pressure elements, two of which are rotatable and one of which is reciprocal relative to the tool.

Still an additional object of this invention is the provision of a seal emplacement tool which is simple in construction and use, which can be produced inexpensively, which is adaptable for use with seals of various degrees of resiliency and of various sizes and cross sectional configurations, which is rugged and not easily susceptible to damage or misadjustment, and which does not require any but ordinary skill, strength or experience on the part of one using it.

Still further and additional objects of the present invention will become apparent from the following description and claims when considered in connection with the appended drawings.

DEFINITIONS

Throughout the preceding and following portions of this specification and the accompanying claims, the following definitions shall be understood to apply:

Seal shall be taken as a generic term broadly meaning any resilient ring type member of a generally circular or symmetrical configuration, whether such member is called a seal or is otherwise termed a gasket, packing, O-ring or some like name.

Cylinder shall be taken as a generic term broadly meaning any cylindrical, sleeve-like, elongate member having an aperture or bore which defines an interior surface of circular or symmetrical cross sectional configuration and which bounds or in which a transverse groove is formed for the reception and retention of a seal.

Groove shall be taken as a generic term broadly meaning any transversely disposed recess, offset, shoulder or other discontinuity which is provided in the bore of a cylinder for the reception and retention of a seal.

Lower shall mean that end of the device on which the seal is carried and which is inserted into the cylinder during the seal emplacement operation.

Upper shall mean that end of the device on which the actuating members are carried and which normally remains outside of the cylinder during the seal emplacement operation.

DESCRIPTION OF THE PREFERRED EMBODIMENT

Figure 1:
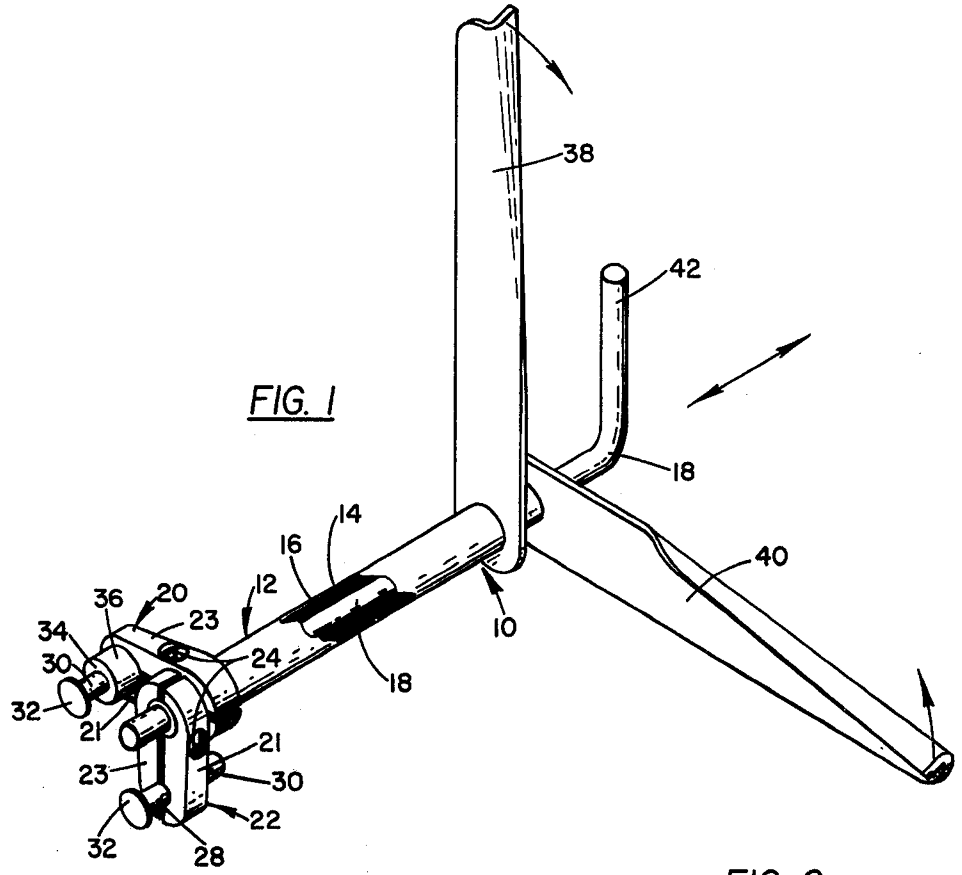
FIG. 1 is a perspective view, partially in cross section, showing a seal installation tool embodying the present invention.

Turning now to the drawings, attention is first called to FIG. 1, in which the preferred embodiment of the present invention is illustrated as comprising a manually operated tool or device 10 having an elongate body assembly 12. Depending upon the distance or depth to which the lower end of the tool may have to be inserted into a cylinder during the seal emplacement process, the body assembly 12 may be provided in practically any reasonable length. For most purposes, however, a length of about six to ten inches has been found generally satisfactory.

The body assembly 12 consists of an outer tubular section 14, an inner tubular section 16, and a cylinder core section 18. Depending upon the conditions under which the tool 12 might be used, these sections may be formed of various materials such as aluminum, brass, stainless steel, or the like. But for most general use purposes, steel tubing and rod material will be found quite satisfactory.

As will be noted from FIG. 1, core section 18 is both longer and somewhat smaller in diameter than the inner tubular section 16, and is telescopically and slidably disposed therein. It will further be noted that inner tubular section 16 is both longer and somewhat smaller in diameter than outer tubular section 14, and is telescopically and rotatably housed therein.

Mounted on body assembly 12 adjacent its lower end are two radially extending arms 20 and 22; arm 20 being mounted on outer tubular section 14, and arm 22 being mounted on inner tubular section 16. In this connection, the extension of inner tubular section 16 beyond outer tubular section 14 should be approximately equal to but no greater than the thickness of arm 22, so that the lower end of section 16 will blend smoothly into the lower surface of arm 22.

Arms 20 and 22 are substantially identical with one another, each consisting of a pair of jaw portions 21 and 23, and an assembly screw 24. As will be evident to those skilled in the art, each pair of jaw portions is provided with oppositely facing juxtaposed surfaces which cooperatively define at least two transversely spaced apertures, the larger of which is sized to tightly engage the tubular section on which that pair is mounted. For example, the larger aperture in the pair of jaw portions comprising arm 20 is sized to receive outer tubular section 14, and the larger aperture in the pair comprising arm 22 is sized to receive inner tubular section 16.

To assure proper positioning as well as to avoid any relative slippage, arms 20 and 22 preferably are "keyed" to tubular sections 14 and 16, respectively. Such "keying" may be accomplished by any one of several different means, but in the illustrated embodiment, a "flat" 26 is ground or otherwise formed on each of the tubular sections for engagement with the cylindrical periphery of screw 24, as best seen from FIG. 5. Thus, as related to each arm, screw 24 not only serves to assemble the jaw portions but as a "key" between the arm and the tubular section on which it is mounted.

The smaller aperture 28 provided by the jaw portions comprising each arm, is sized to receive and releasably clamp the shank of a generally cylindrical spindle or pressure element 30. Preferably, each spindle 30 terminates on its lower end in a relatively thin shoulder 32 of increased diameter. Further, it is desirable to provide a relatively long shank on each spindle 30 to permit its adjustment for purposes of accommodating seals of various cross sectional heights.

A spacer or collar 34 is mounted on the shank of spindle 30, carried by arm 20, the thickness of this spacer preferably being substantially the same as or somewhat less than the thickness of arm 22. The lower surface of the collar 34 may thus be aligned with the lower surface of arm 22, and clamped in that position by set screw 36.

As will be apparent from the preceding description, outer and inner tubular body sections 14 and 16 are rotatable relative to each other to effect conjoint relative rotation between arms 20 and 22 and the spindles or pressure elements 30 carried thereon. And while such relative rotation may be provided by various other types of structure, the illustrated embodiment provides a pair of radially extending handles 38 and 40, welded or otherwise attached to outer and inner tubular body portions 14 and 16, respectively. In this connection, with arm 22 mounted on inner tubular section 16 as illustrated in FIG. 1, handle 40 should be so positioned on section 16 as to form a stop engagable with the upper end of outer tubular section 14. Arm 22 and handle 40 thus cooperate to restrain sections 14 and 16 against relative axial movement.

As pointed out heretofore, core section 18 of body assembly 12 extends beyond both ends of and is axially slidable through inner tubular section 16. Preferably, core section 18 is of such length that it can be extended beyond the lower end of section 16 and arm 22 a distance equal to that by which the spindles 30 can be extended beyond arms 20 and 22. Thus, regardless of the distance the spindles 30 may be extended to accommodate a particular seal, the core section 18 can be extended an equal amount.

The upper end of core section 18 may be bent at an approximate 90° angle to provide both a handle 42 and a means of limiting downward movement of core 18 relative to the balance of the tool.

Figure 2:
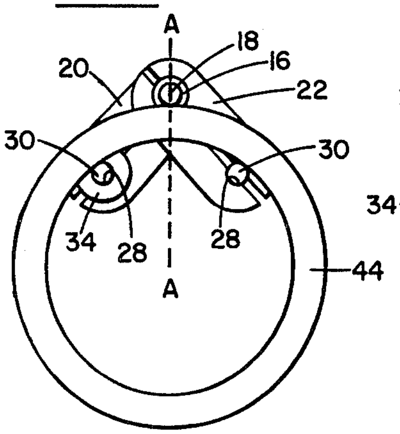
FIG. 2 is a bottom plan view of the lower portion of the tool of FIG. 1, showing the three pressure elements engaged with an undistorted ring type seal.

To prepare the tool 12 for use in inserting or emplacing a seal 44 in the groove of a cylinder, the user should first adjust the extension of spindles 30 and collar 34 so that the seal will fit freely but snugly between the upper surface of shoulders 32 and the lower surface of arm 22 and collar 34. The core section 18 should then be extended beyond the lower surface of arm 22 a distance sufficient to align its lower end with the lower ends of spindles 30. Subsequently, the handles 38 and 40 are rotated to position spindles 30 and core 18 approximately as shown in FIG. 2, and the seal 44 then placed therebetween.

Figure 3:
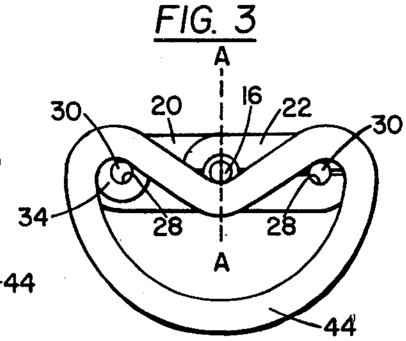
FIG. 3 is a bottom plan view of the lower portion of the tool of FIG. 1, showing two of the pressure elements in a partially rotated position and the seal partially deformed.

As thus disposed, the lower end of core section 18 forms a first pressure element positioned against the outer periphery of the ring type seal 44, and the spindles 30 form second and third pressure elements positioned against the inner periphery of the seal at points which are spaced radially approximately an equal distance from a line (shown as dotted line A—A in FIGS. 2–4) which extends from the center of the seal through the first pressure element 18.

After positioning the seal between the three pressure elements as above described, the handles 38 and 40 are rotated toward each other as indicated by the arrows in FIG. 1. Such rotation, of course, will result in relative rotation between outer and inner tubular body portions 14 and 16 and conjoint rotation between arms 20 and 22. Since spindles 30 are carried by arms 20 and 22, they will rotate outwardly in opposite directions relative to the core section 18, forcing the seal 44 to fold inwardly on itself around core section 18, as shown successively in FIGS. 3 and 4.

Figure 4:
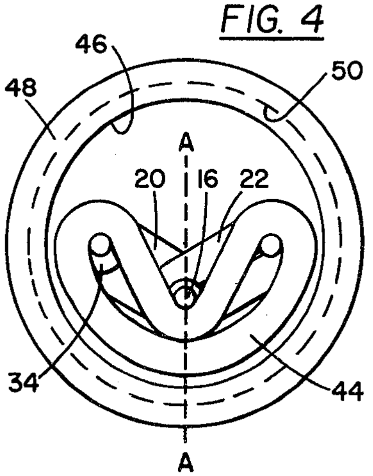
FIG. 4 is a bottom plan view of the lower portion of the tool of FIG. 1, showing the two pressure elements further rotated and the seal folded inwardly while being positioned in a sleeve or cylinder.

Such folding of seal 44 will, of course, result in a significant reduction in the transverse area circumscribed by its outer periphery. Accordingly, as illustrated in FIG. 4, the lower end of tool 12 and folded seal 44 may be inserted easily into the bore 46 of cylinder 48 having a groove 50 intended for the reception of the seal. As will be noted from a comparison between seal 44 in FIG. 2 and bore 46 in FIG. 4, the outer periphery of the undistorted seal is significantly larger than the circumference of the bore. Thus, without the benefit of the reduced area circumscribed by the outer periphery of the inwardly folded seal, considerable difficulty would be encountered in attempting to push the seal through the bore 46 and into the groove 50.

Proper alignment of the seal 44 with the groove 50 is accomplished easily, merely by keeping an exposed portion of the folded seal lightly in contact with the wall of the bore and sliding it therealong until encountering the groove. As thus positioned, the handle 42 of the tool 12 is pulled outwardly to draw the first pressure element into the lower end of the body assembly 12 and out of contact with seal 44. As a result of the release of pressure on seal 44, it will unfold to its original configuration, simultaneously seating itself in groove 50.

One of the features of the present invention is the ease with which it may be adapted for use in emplacing seals of various sizes and configurations. For example, merely by loosening screws 24 and moving collar 36, the extension of spindles 30 may be adjusted to accommodate a seal of practically any height. Or should one set of arms 20 and 22 be too long or too short for the bore of a particular cylinder, that set may be replaced readily by one of appropriate length merely by loosening screws 24 sufficiently to release tubular body sections 14 and 16 and spindles 30. In most instances, of course, spindles 30 would not be replaced but simply transferred to the replacement set of arms.

Figure 5:
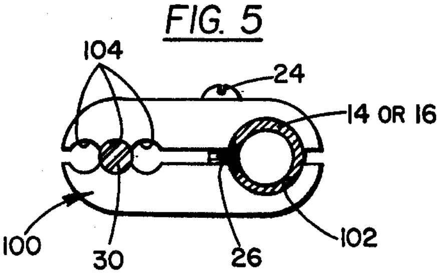
FIG. 5 is an end view of one of the arms of the embodiment of FIG. 1, showing a pressure element having an outer cylindrical surface which is formed axially to complement the cross sectional configuration of the inner periphery of the seal.

Under certain circumstances, as with a seal of unusual thickness, it may be desirable to adjust the radial spacing between spindles 30 and the lower end of core section 18 without replacing arms 20 and 22. In this event, the arms may be provided with more than one aperture of a size adapted to clamp the shank of spindles 30. In this connection, attention is called to FIG. 5, illustrating an arm 100 having a larger aperture 102 sized to releasably clamp one of the tubular body sections 14 or 16, and two or more apertures 104 sized to releasably clamp spindle 30. In all other respects, arm 100 is structurally and functionally equivalent to above described arms 20 and 22.

Figure 6:
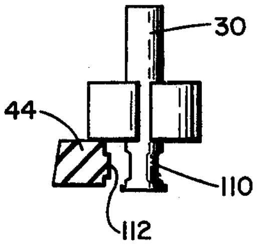
FIG. 6 is a bottom plan view of an arm similar to that shown in the embodiment of FIG. 1, except for modification to provide more than one aperture to permit changing the radial spacing of two of the pressure elements.

FIG. 6 illustrates a modified form of spindle 30, in which the cylindrical surface 110 is shaped to complement the cross sectional shape or angle of the inner periphery 112 of seal 44. Particularly if seal 44 presents the combination of a relatively high degree of stiffness and an angled or configured inner periphery, it may have a tendency to become slightly "cocked" as it is being folded in the manner shown in FIGS. 2–4. In this event, any such tendency will be alleviated by turning or otherwise forming the cylindrical wall of spindles 30 to complement the periphery of the seal. The same shaping procedure could, of course, be applied to the lower end of core section or pressure element 18 should any tendency be found for the seal 44 to shift or move thereon as it is being deformed.

It should perhaps be pointed out that seal 44 may be mounted on or grasped by tool 12 using either of two procedures. First, the seal may simply be placed on a work bench, table or the like, and the tool lowered thereon with the pressure elements disposed as shown in FIG. 2. Or alternately, the seal 44 may be placed manually over the pressure elements while the tool 12 is being held horizontally, upside down or at some other angle by the user. In either event, after the seal is properly positioned between the pressure elements, subsequent deformation is easily accomplished merely by grasping and rotating handles 38 and 40 as above described.

Although the process and device described and illustrated herein are particularly useful with seals of generally rectangular or trapezoidal cross sectional configuration as illustrated generally in FIG. 6, it will be understood, of course, that the invention is not limited to use with such seals, as it is equally useful with O-rings and other types of seals. Also, as mentioned heretofore, the invention is not limited to a manually operated process and/or tool, since it could be adapted readily for use with an automatic or semi-automatic seal assembly machine. Thus, it is to be understood that the preceding description and appended drawings are for the purpose of illustrating and not limiting the present invention, the scope of which is to be defined by the following claims:

I claim:

1. A process of selectively reducing the transverse area circumscribed by the outer periphery of a generally symmetrical resilient ring type seal to permit its placement in a groove formed in an interior surface having a circumference which is less than the periphery of said seal, said process comprising the steps of a. positioning a first pressure element in engagement with the outer periphery of said seal,
b. positioning a second pressure element in engagement with the inner periphery of said seal at a point which is radially offset in one direction from a line extending from the axial center of said seal through said first pressure element,
c. positioning a third pressure element in engagement with said inner periphery at a point which is radially offset in the other direction from said line,
d. rotatably shifting said second and third pressure elements transversely relative to said first pressure element in a direction outwardly of said center to fold a portion of said seal inwardly around said first pressure element and thereby reduce the area circumscribed by said seal, and
e. displacing one of said pressure elements axially relative to and out of engagement with said seal whereby said folded portion is permitted to unfold in response to said resiliency of said seal.

2. A process according to claim 1, characterized by the step of spacing said second and third pressure elements substantially equally from said first pressure element.

3. A process according to claim 2, characterized by the step of establishing said first pressure element as an axis around which said second and third pressure elements rotate as they are shifted outwardly of said center.

4. A process according to claim 3, characterized by the step of restraining said second and third pressure elements against relative axial displacement whereby said first pressure element comprises said axially displaceable pressure element.

5. A device for selectively reducing the transverse area circumscribed by the outer periphery of a generally symmetrical resient ring type seal to permit its placement in a recess formed in an interior surface having a circumference which is less than the periphery of said seal, said device being characterized by a. a first pressure element engagable with the outer periphery of said seal,
b. a second pressure element engagable with the inner periphery of said seal at a point which is radially offset in one direction from a line extending from the axial center of said seal through said first pressure element,
c. a third pressure element engagable with said inner periphery at a point which is radially offset in the other direction from said line,
d. means for rotatably shifting said second and third pressure elements transversely relative to said first pressure element in a direction outwardly of said center to fold a portion of said seal inwardly around said first pressure element and thereby reduced the area circumscribed by said seal, and
e. means for displacing one of said pressure elements axially relative to and out of engagement with said seal whereby said folded portion is permitted to unfold in response to said resiliency of said seal.

6. A device according to claim 5, characterized by means for spacing said second and third pressure elements substantially equally from said first pressure element.

7. A device according to claim 6, characterized by means for establishing said first pressure element as an axis around which said second and third pressure elements rotate as they are shifted outwardly of said center.

8. A device according to claim 7, characterized by means for restraining said second and third pressure elements against relative axial displacement whereby said first pressure element comprises said axially displaceable pressure element.

9. A device according to claim 8, characterized by a. first and second arms disposed radially relative to said first pressure element,
b. each of said arms supporting one of said other pressure elements in said spaced relationship with said first pressure element, and c. means for rotating said arms relative to each other in opposite directions around said first pressure element.

10. A device according to claim 9, characterized by a body assembly comprising a. a generally tubular outer section, b. a generally tubular inner section telescopically and rotatably housed in said outer section, and c. a generally cylindrical core section telescopically and slidably housed in said inner section.

11. A device according to claim 10, characterized by a. said arms being carried proximate one another adjacent the lower end of said body assembly, with said first arm being mounted on said outer section and said second arm being mounted on said inner section, and b. said cylindrical core section being extendable beyond the lower end of said body assembly and comprising said first pressure element.

12. A device according to claim 11, characterized by said first pressure element being integral with said core section and sized for sliding reciprocal movement within the lower end of said inner section.

13. A device according to claim 12, characterized by said second and third pressure elements comprising generally cylindrical spindles supported by said arms in a generally parallel relationship with each other and with said first pressure element.

14. A device according to claim 13, characterized by each of said arms comprising a. a pair of jaw portions providing oppositely facing juxtaposed surfaces which cooperatively define at least two transversely disposed apertures, i. one of said apertures being sized to releasably engage one of said tubular body sections and ii. the other of said apertures being sized to releasably engage one of said spindles, and b. means for selectively drawing said jaw portions and said juxtaposed surfaces toward each other to simultaneously and releasably engage in said apertures one of said tubular body sections and one of said spindles.

15. A device according to claim 14, characterized by the feature that said juxtaposed surfaces cooperatively define more than one aperture of said spindle engaging size.

16. A device according to claim 13, characterized by the periphery of said generally cylindrical spindles being formed axially to substantially complement the cross sectional configuration of said inner periphery of said seal.

17. A device according to claim 13, characterized by a. said inner body section being longer than and extending beyond the ends of said outer body section, with said second arm being mounted thereon externally of said outer body section, b. said means for rotating said arms comprising i. a first actuating member fixed to said outer body section adjacent its upper end and ii. a second actuating member fixed to said inner body section adjacent its upper end externally of said outer body section, c. said second arm and said second actuating member being engagable respectively with said lower and upper ends of said outer body section to restrain said inner and outer body sections against relative axial displacement.

18. A device according to claim 17, characterized by said actuating members comprising manually engagable handles extending transversely from said body assembly.

19. A device according to claim 18, characterized by said displacing means comprising a third handle extending transversely from the upper end of said core section externally of said inner body section.

20. A device according to claim 19, characterized by said spindles a. having relatively long shanks whereby the extension of said spindles relative to said arms may be selectively varied to accommodate seals of various heights, and b. terminating at their lower ends in a relatively thin collar of enlarged diameter.

21. A device according to claim 20, characterized by a. a spacer axially movable on the spindle carried by said first arm, and b. means for releasably positioning said spacer on said spindle whereby the lower surface of said spacer may be transversely aligned with the lower surface of said second arm.

* * * * *